United States Patent
Song et al.

(10) Patent No.: US 11,472,926 B2
(45) Date of Patent: Oct. 18, 2022

(54) IMPACT PROTECTION MATERIAL AND METHOD OF MAKING THE SAME

(71) Applicant: Nano and Advanced Materials Institute Limited, Hong Kong (HK)

(72) Inventors: Jianjun Song, Hong Kong (HK); Kwok Keung Paul Ho, Hong Kong (HK); Han Wang, Hong Kong (HK); Kang Zhang, Hong Kong (HK); Liang Zhang, Hong Kong (HK); Cheng Chen, Hong Kong (HK); Sze Kui Lam, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 393 days.

(21) Appl. No.: 16/753,342

(22) PCT Filed: Oct. 10, 2018

(86) PCT No.: PCT/CN2018/109594
§ 371 (c)(1),
(2) Date: Apr. 3, 2020

(87) PCT Pub. No.: WO2019/072186
PCT Pub. Date: Apr. 18, 2019

(65) Prior Publication Data
US 2020/0239640 A1    Jul. 30, 2020

Related U.S. Application Data

(60) Provisional application No. 62/606,766, filed on Oct. 10, 2017.

(51) Int. Cl.
| | |
|---|---|
| *C08G 77/398* | (2006.01) |
| *C08K 3/22* | (2006.01) |
| *C08K 3/26* | (2006.01) |
| *C08K 3/36* | (2006.01) |
| *C08L 83/08* | (2006.01) |
| *C08G 101/00* | (2006.01) |

(52) U.S. Cl.
CPC .............. *C08G 77/398* (2013.01); *C08K 3/22* (2013.01); *C08K 3/26* (2013.01); *C08K 3/36* (2013.01); *C08L 83/08* (2013.01); *C08G 2101/00* (2013.01); *C08K 2003/2227* (2013.01); *C08K 2003/2241* (2013.01); *C08K 2003/265* (2013.01)

(58) Field of Classification Search
None
See application file for complete search history.

(56) References Cited

FOREIGN PATENT DOCUMENTS

| CN | 103772960 | * | 1/2016 |
| WO | WO 03/055339 | * | 7/2003 |

OTHER PUBLICATIONS

Machine translation Feng et al. CN 1037729608 (Year: 2014).*
Verdolotti et all. Polymer 56 (2015) 20-28.*

* cited by examiner

*Primary Examiner* — Robert T Butcher
(74) *Attorney, Agent, or Firm* — Idea Intellectual Limited; Margaret A. Burke; Sam T. Yip

(57) ABSTRACT

The present invention provides new impact protection materials and the method of making the same. More specifically, the impact protection materials are polymer-based shear-thickening composite comprising a non-shear-thickening polymer matrix material and one or more shear-thickening materials. Preferably, the non-shear-thickening polymer matrix material is in an amount from approximately 5 weight percent to approximately 90 weight percent with the balance being one or more shear-thickening materials. The first type of the one or more shear-thickening materials is sol-gel based shear-thickening material in which small inorganic particles are connected in a gel network; the second type is polymer-based shear-thickening material in which polymer chains form network. Compared to the existing shear-thickening materials, the present shear-thickening materials have different molecular structure and formulation and possess properties of good impact protection and good stability.

20 Claims, No Drawings

IMPACT PROTECTION MATERIAL AND METHOD OF MAKING THE SAME

CROSS-REFERENCE TO RELATED APPLICATIONS

This application is a 371 application of International Patent Application No. PCT/CN2018/109594 filed Oct. 10, 2018, which claims priority from the U.S. Provisional Patent Application Ser. No. 62/606,766 filed Oct. 10, 2017, and the disclosures of which are incorporated herein by reference in their entirety.

FIELD OF THE INVENTION

The present invention relates generally to energy absorption materials that dissipate and mitigate the peak force upon exerted impact and, providing impact protection for objects or human bodies; referred to hereinafter as impact protection materials.

BACKGROUND

The severity of injuries to human being or damages to an object caused by impact depends on the peak force exerted during impact. The peak force can be attenuated by impact protectors. Considering the fall of a fragile object with mass m from height h to the surface of an impact protector, the kinetic energy E at impact, which is equal to the potential energy of the device, i.e., $E=\frac{1}{2}mv^2=mgh$. Where v is the velocity of the object at impact, g is the gravitational constant. To stop the device and absorb the impact energy, an effective impact protector should be able to attenuate the force F before it arrives at a level of the fracture threshold. Otherwise the object may have the risk of damage.

Various materials have been examined for impact protection; the most popular materials available in market may be the following: closed cell foam of polyethylene and its derivatives, open cell urethane foam and dilatants materials.

Ethylene vinyl acetate (EVA) foam is a specific type of cross-linked closed cell polyethylene type of foam, popularly known as expanded rubber or foam rubber. EVA is lightweight, easy to form, odorless and cheaper compared to natural rubber, and used as padding and shock absorber. However, the foam pads are usually designed for a certain level impact; they may not optimally absorb the impact which is higher or lower than the designed level.

Recently, shear-thickening materials, known as dilatants, have been used as energy absorbing materials in impact absorption systems. A shear-thickening material or dilatant means a material deforms at low rates of deformation but undergoes a substantial increase in viscosity and becomes stiff or rigid at high deformation rates.

One well-known dilatant is the material marketed by Dow Corning under catalogue No. 3179. It is claimed to comprise borated siloxane-based material.

Poron XRD is an open cell Polyurethane foam. It is claimed that when it is at rest above the glass transition temperature of the PU polymer, it is soft and flexible; when stressed at a high rate or impacted quickly, the urethane molecules stiffen to protect the wearer from damage.

D3O is a polymer composite (in some product forms with Polyurethane as main component) which is claimed to contain a chemically engineered dilatant; the material is soft and flexible in its normal state or at a low rate of deformation; however at an elevated rate of deformation when impacted by force, it locks itself and undergoes a substantial increase in its viscosity, and subsequently becomes stiff and rigid.

Dow Corning 3179, Poron XRD and D3O are polymer based dilatants; there are other dilatants such as oxide particle based dilatants. These dilatants consist of particles suspended in carrier material. In the natural state or at a low deformation rate, the particles are free to move and the material displays a good flowability; at a high deformation rate, the clusters formed by hydrodynamic lubrication forces, the flowability of the particles is restricted and the material is stiffened, impact energy can be absorbed and dissipated to a larger area and finally attenuated.

Though demonstrated for years and widely studied in literature, particle-based shear-thickening material (one typical examples is $SiO_2$ particles dispersed in polyethylene glycols (PEG)) in its plain form has limited applications. One reason is that the particle/carrier material mixture is usually unstable when the particles agglomerate and precipitate; another reason is that particle-based shear-thickening material is not convenient to be applied directly as impact protector.

SUMMARY OF THE INVENTION

Disclosed are new impact protection materials and the method of making the same. More specifically, the impact protection materials are polymer-based shear-thickening composite comprising a non-shear-thickening polymer matrix material and one or more shear-thickening materials. Preferably, the non-shear-thickening polymer matrix material is in an amount from approximately 5 weight percent to approximately 90 weight percent with the balance being one or more shear-thickening materials. More preferably, the non-shear-thickening polymer matrix material is in an amount from approximately 10 weight percent to approximately 30 weight percent with the balance being the one or more shear-thickening materials. The first type of the one or more shear-thickening materials is sol-gel based shear-thickening material in which small inorganic particles are connected in a gel network; the second type is polymer-based shear-thickening material in which polymer chains form regular or irregular network. Compared to the existing shear-thickening materials, the present shear-thickening materials have different molecular structure and formulation and possess properties of good impact protection and good stability. In addition, the present impact protection materials can be further developed into different composites and product forms for different applications. More specifically, the sol-gel-based shear-thickening material is a micro-network of inorganic particles in gel in which the inorganic particles are selected from silica, titania, alumina, or calcium carbonate; the polymer-based shear-thickening material is polyborodimethylsiloxane (PBDMS) with two or more Si—O—B—$(OH)_2$ groups in which the silicon atom of each of the Si—O—B—$(OH)_2$ groups in a non-terminal position of polyborodimethylsiloxane is bonded to 3 oxygen atoms and 1 carbon atom. The PBDMS with two or more Si—O—B—$(OH)_2$ groups can also be represented by the following formula:

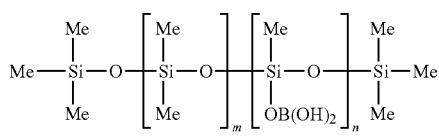

wherein the ratio of m:n is 168-700:5.3-6.1; Me is methyl group.

DETAILED DESCRIPTION

It is necessary to understand that the subject matter described herein is not limited to particular embodiments described, as such may vary.

The conventional oxide particle based dilatants usually consist of particles (solid phase) suspended in carrier material. Typical particles include silica, titania, calcium carbonate and etc., typical carrier materials include water, ethylene glycol (EG), polyethylene glycol (PEG) and etc.

Instead of using particles to form particle based shear-thickening material, which as described above usually have stability problem, sol-gel method processed gel is used in the present invention. The present sol-gel-based shear-thickening material is similar to conventional particle-based shear-thickening material in the sense that both materials are solid phase/carrier material mixtures, but they are different in formulation, process of preparation and the impact protection performance.

Explicitly, gel is prepared through sol-gel method from a formulation of precursor chemicals, solvent and additives. The possible candidates of the solid phase include silica, titania, calcium carbonate and etc. For solvent, the most common one is alcohol or mixture of alcohol and water. The choices of additive include acids and alkalis, which will be used to tune the hydrolysis and polymerization reactions in the solution. After mixing precursor chemicals with solvent and additive, the precursor solution is left for reaction and aging. Different inorganic particles have different precursor material with different concentrations. For example, the concentration of alkoxysilane tetraethyl orthosilicate (TEOS) for $SiO_2$ particles is about 0.1-1.0 mol/L; the concentration of titanium isopropoxide (TIP) for $TiO_2$ particles is about 0.1-0.8 mol/L; the concentration of aluminum nitrate [$Al(NO_3)_3$] for $Al_2O_3$ particles is about 0.2-0.6 mol/L.

To reduce the reaction and aging time, and improve the controllability of the size of particles in gel, a sol-gel method in which additives are added in three stages will be used. In the first stage, additive is added to promote the hydrolysis and polymerization in the solution; this will reduce the reaction time. In the second stage, additive is added to tune the pH value of the solution close to the isoelectric point; this will change the surface charges and control the particle formation. In the final stage, additive is added to assist a homogeneous distribution of nanoparticles and prevent them from agglomeration; this will improve the controllability of particle size and the stability of the gel.

The first additive is to accelerate the hydrolysis and polymerization reactions in the solution. The first additive can include but not limited to one or more acids such as one or more of hydrochloric acid (HCl), nitric acid, sulfuric acid, acetic acid, oxalic acid, and etc., and one or more alkalis such as one or more of sodium hydroxide, potassium hydroxide, aqueous ammonia, and etc. The amount and concentration of the first additive depends on the specific precursor, the concentration of the precursor, and etc. For example, if TEOS is used as the precursor and HCl as the first additive, the pH value of the solution should be in the range between 1.50 and 5.00 when HCl is added.

In the second stage, the second additive is added to tune the pH value of the solution close to but not identical to the zero charge point. The second additive can be the same or different from that or those of the first additive. It can include but not limited to single component or a mixture of acids such as one or more of hydrochloric acid (HCl), nitric acid, sulfuric acid, acetic acid, oxalic acid, and etc., and one or more alkalis such as one or more of sodium hydroxide, potassium hydroxide, aqueous ammonia, and etc. The amount and concentration of the second additive depends on the factors like the pH value of the solution, the isoelectric point of specific precursor and etc. For example, if TEOS (isoelectric point of silica is about pH 2.20) is used as the precursor and HCl as the second additive, the pH value of the solution should be in the range 1.60-2.15 or 2.25-3.00 when the second additive is added.

In the final stage, the third additive is added to assist a uniform distribution of the colloidal particles and prevent them from contacting and agglomerating. This additive can be but not limited to single component or mixture of surfactants like triton, poloxamers, polysorbate and etc. If triton is used, the concentration of the triton is in the range 0.0001-0.01 mol/L.

After the gel formed with particles connected in micro networks, carrier fluid like EG, PEG and other polymers are used to form the sol-gel-based shear-thickening material by dispersing gel into the fluid. To form a shear-thickening material with high performance, it is essential to improve the association between the solid phase and the carrier material. One way is to functionalize particles in gel before mixing by using a coupling agent. Auxiliary energies like heating, ultrasonic wave, UV irradiation, plasma treatment and etc. may be used to accelerate the dispersion process to achieve a better association.

Sol-gel-based shear-thickening material is integrated into a polymer to form composite impact protection material. There are several ways to form the composite impact protection material. One way is to disperse the sol-gel based shear-thickening material of the present invention into a rubber and then cured together to form composite. Another way is to disperse the shear-thickening material into a thermoplastic to form composite. Yet another way is to disperse the sol-gel based shear-thickening material into an oligomer or monomer (polymer precursor), and then to react to form composite. In some circumstances, the composite can even be foamed to tune the density, hardness and resilience to meet the requirement of specific applications.

The sol-gel-based shear-thickening material may also be impregnated into polymer foams.

The sol-gel-based shear-thickening material may be encapsulated by a shell material (usually thermoplastic materials) to form a core-shell structure.

The sol-gel-based shear-thickening material may also be coated onto fabric or film or other substrates for impact protection.

Major component in conventional particle-based shear-thickening materials, like silicon dioxide particles, can be added into the sol-gel-based shear-thickening material to improve the solid/carrier material ratio.

It is well known that amorphous polymers like Poly (vinyl alcohol) containing boric acid, and poly (dimethylsiloxane) containing boric acid (PBDMS) has shear-thickening properties. Upon impact, the association between polymer molecules will be enhanced and the viscosity of PBDMS increases. Instead of using simple dilatant polymer, a new dilatant polymer is synthesized in the present invention using different reactants and synthetic routes, which improves impact protection performance and the processability of the polymer for other applications.

Typical synthesis of PBDMS is mixing and heating silanol (dihydroxy terminated PDMS) and boric acid with or without the presence of solvent such as methanol or toluene at elevated temperature in glassware or reactor. However, this normally leads to incomplete reaction of boric acid with hydroxy groups from silanol, and difficulty of removal of organic solvent. In this case, if a complete reaction is wanted, a dilute and extremely long reaction time is needed. To solve this problem, silicone rubber, instead of silanol oil, is employed in the present invention to react with boric acid in an internal mixer at elevated temperature. The present method not only avoids the usage of solvent, but also improves the completion of reaction and shortens the reaction time.

The network of polymer chains may be regular or irregular. The network of polymer may maximize the shock absorption/impact dissipation. The irregular network may be formed by etherification/esterification reaction of acid with alcohol containing polymers under selected conditions.

PBDMS is typically synthesized via condensation reaction between boric acid and hydroxyl terminated linear poly(dimethylsiloxane). Due to the limitation of commercial availability of starting material, this class of compound has maximum 2 Si—O—B—(OH)$_2$ which must be located in the terminal. PBDMS with multiple Si—O—B—(OH)$_2$ are generally rare. Moreover, the silicon atom of Si—O—B—(OH)$_2$ is bonded to 2 oxygen atoms and 2 carbon atoms. One example is

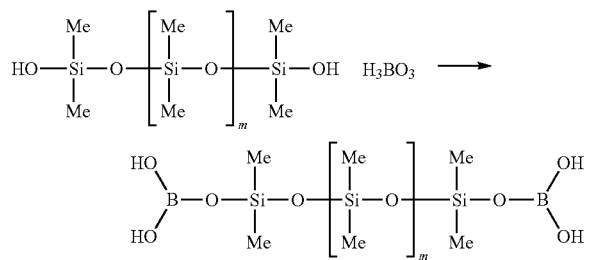

A novel reaction is developed to synthesize PBDMS with multiple Si—O—B—(OH)$_2$ via dehydrogenation between boric acid and polydimethylsiloxane-co-methylhydrosiloxane. PBDMS can be synthesized with multiple Si—O—B—(OH)$_2$ which can exist as substitutes at any position to the parent chain, including terminal and non-terminal positions. Regarding the PBDMS with Si—O—B—(OH)$_2$ in the non-terminal position, the silicon atom of Si—O—B—(OH)$_2$ is bonded to 3 oxygen atoms and 1 carbon atom of which is a new class of compound. One example is

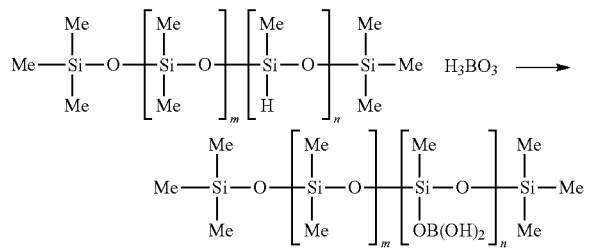

The following chemical formula represents this new class of compound:

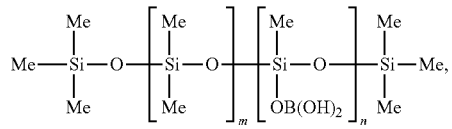

wherein the ratio of m:n is 168-700:5.3-6.1; Me is methyl group.

Trimethylsilyl terminated polydimethylsiloxane-co-methylhydrosiloxane with 3-4 mol % silane (32.5 g, 2.5 mmol Si—H, molecular weight=13000), dioxane (80 mL) and boric acid (1.9 g, 30.0 mmol) were pre-mixed before the addition of Karstedt's catalyst (0.05 mL, 2% in p-xylene). The mixture was refluxed for 18 hours under nitrogen. Then, the mixture was concentrated to afford a non-sticky plastic. The force reduction measurement uses a 1 kg metal ball with 49 cm dropping height 8.3 mm thick sample can reduce 85% of the force, or the impact force was reduced from 11814N to 1788N. The impact protection material formed by this formulation is more suitable for lower impact.

Trimethylsilyl terminated polydimethylsiloxane-co-methylhydrosiloxane with 0.5-1.0 mol % silane (26.2 g, 0.5 mmol Si—H, molecular weight=45000-60000), dioxane (120 mL) and boric acid (0.3 g, 5.2 mmol) were pre-mixed before the addition of Karstedt's catalyst (0.02 mL, 2% in p-xylene). The mixture was refluxed for 18 hours under nitrogen. Then, the mixture was concentrated to afford a non-sticky plastic. The force reduction measurement uses a 1 kg metal ball with 49 cm dropping height 8.3 mm thick sample can reduce 81% of the force from, or the impact force reduced from 11814N to 2219N. The impact protection material formed by this formulation is more suitable for higher impact.

Apart from boric acid, the dehydrogenation of polydimethylsiloxane-co-methylhydrosiloxane can be extended to other nucleophiles including silanol, primary alcohol, secondary alcohol, tertiary alcohol, primary amine, secondary amine, tertiary amine and phosphoric acid.

The performance of the polymer-based shear-thickening material may also be enhanced by integrating with the full sol-gel-based shear-thickening material, or major component of sol-gel-based shear-thickening material.

The polymer-based shear-thickening material may form composite with other polymers. The polymer can be PDMS or thermoplastic like PC, MBS, EVA and etc. The composite may have different physical, mechanical and chemical properties.

Foam structure may also be developed for polymer-based shear-thickening material.

Composite of polymer-based shear-thickening material and fiber, or other fillers including fillers for strengthening, fillers for luminescence, fillers for conductance, fillers for self-repairing and etc. may also be developed.

Core-shell structure, also called microcapsules, is a solid, liquid or gas core being encapsulated by a solid shell. Both the core and shell can be inorganic or organic materials. Core-shell structure for polymer-based shear-thickening material may also be developed to encapsulate polymer-based shear-thickening material with a shell polymer. Shell material may have desired physical/chemical/mechanical properties, while polymer-based shear-thickening material as the core has good impact absorption performance. The core-shell structure therefore provides good impact protection while retaining desired properties of shell material.

For the purpose of impact protection, flexible thermoplastic polymers are adopted as non-shear-thickening matrix material including but not limited to EVA, PVA, SBR, SBS or PAN as the shell, while polymer-based shear-thickening material having good impact absorption performance is used to form the core. The core-shell structure therefore provides good impact protection while retaining flexibility of shell material.

In order to obtain the present core-shell structure, different polymerization methods including but not limited to emulsion polymerization, suspension polymerization, dispersion polymerization and etc. will be used. Surfactant and stabilizer may also be applied to the polymerization procedure for sake of obtaining microcapsules with desired size and even diameters.

It is desired that polymer-based shear-thickening material can be self-healed. Hydrogel or other materials with self-healing function may be impregnated into polymer-based shear-thickening material, making the shear thickening material self-healable or self-repairable.

Polymer-based shear-thickening material may also be applied as a coating on fabric or other surfaces for impact protection.

The invention claimed is:

1. A polymer-based shear-thickening composite comprising a non-shear-thickening polymer matrix material in an amount from approximately 5 weight percent to approximately 90 weight percent with the balance being one or more shear-thickening materials comprising a sol-gel shear-thickening material in which inorganic particles formed from a precursor are connected in a gel network;

wherein the one or more shear-thickening materials further comprise a polymer-based shear-thickening material comprising polyborodimethylsiloxane with two or more Si—O—B—(OH)$_2$ groups represented by the following formula:

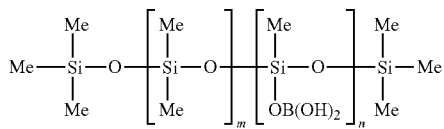

wherein the ratio of m:n is 168-700:5.3-6.1, Me is methyl group.

2. The polymer-based shear-thickening composite according to claim 1, wherein the inorganic particles are selected from silica, titania, alumina, or calcium carbonate.

3. The polymer-based shear-thickening composite according to claim 1, wherein the inorganic particles are formed from precursors selected from tetraethyl orthosilicate, titanium isopropoxide, or aluminum nitrate.

4. The polymer-based shear-thickening composite according to claim 3, wherein said tetraethyl orthosilicate is in a concentration of 0.1 to 1.0 mol/L.

5. The polymer-based shear-thickening composite according to claim 3, wherein said titanium isopropoxide is in a concentration of 0.1 to 0.8 mol/L.

6. The polymer-based shear-thickening composite according to claim 3, wherein said aluminum nitrate is in a concentration of 0.2 to 0.6 mol/L.

7. The polymer-based shear-thickening composite according to claim 1, wherein the non-shear-thickening polymer material is a thermoplastic polymer material.

8. The polymer-based shear-thickening composite according to claim 1, wherein the non-shear-thickening polymer material is a thermoset polymer material.

9. The polymer-based shear-thickening composite according to claim 1, wherein the non-shear-thickening polymer material includes both thermoplastic and thermoset polymer materials.

10. The polymer-based shear-thickening composite according to claim 1, further comprising a foaming agent such that the polymer-based shear-thickening composite is a foam.

11. The polymer-based shear-thickening composite according to claim 1, wherein the sol-gel shear-thickening material is dispersed into a rubber and then cured to form the composite.

12. The polymer-based shear-thickening composite according to claim 1, wherein the sol-gel shear-thickening material is dispersed into a thermoplastic to form the composite.

13. The polymer-based shear-thickening composite according to claim 1, wherein the sol-gel shear-thickening material is dispersed into oligomer or monomer precursor of the non-shear-thickening polymer followed by reaction to form the composite.

14. The polymer-based shear-thickening composite according to claim 1, wherein the non-shear-thickening polymer matrix material forms a core-shell structure around the sol-gel shear-thickening material.

15. The polymer-based shear-thickening composite according to claim 1, wherein the polyborodimethylsiloxane with two or more Si—O—B—(OH)$_2$ groups is synthesized by reacting boric acid with polydimethylsiloxane-co-methylhydrosiloxane via dehydrogenation or synthesized by reacting silicone rubber with boric acid.

16. A polymer-based shear-thickening material having the following chemical formula:

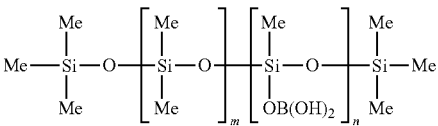

wherein the ratio of m:n is 168-700:5.3-6.1; Me is methyl group.

17. The polymer-based shear-thickening material of claim 16, wherein said material is synthesized by reacting boric acid with polydimethylsiloxane-co-methylhydrosiloxane via dehydrogenation.

18. The polymer-based shear-thickening material of claim 17, wherein polydimethylsiloxane-co-methylhydrosiloxane is trimethylsilyl terminated polydimethylsiloxane-co-methylhydrosiloxane.

19. The polymer-based shear-thickening material of claim 17, wherein impact force reduction of said polymer-based shear-thickening material is tunable by varying the molecular weight of silane added during reaction between boric acid and polydimethylsiloxane-co-methylhydrosiloxane via dehydrogenation.

20. The polymer-based shear-thickening material of claim 16, wherein polymer-based shear-thickening material is self-healed or self-repaired.

* * * * *